Dec. 1, 1959 J. B. RICKETTS, JR., ET AL 2,915,740

STATIC MAGNETIC MEMORY SYSTEM

Filed Sept. 17, 1956

INVENTORS
ERIC E. BITTMANN
JOSEPH DEUTSCH
JAMES B. RICKETTS, JR

BY Arthur W. Collins

ATTORNEY.

United States Patent Office 2,915,740
Patented Dec. 1, 1959

2,915,740

STATIC MAGNETIC MEMORY SYSTEM

James B. Ricketts, Jr., Milwaukee, Wis., and Eric E. Bittmann, Downingtown, and Joseph Deutsch, Berwyn, Pa., assignors to Burroughs Corporation, Detroit, Mich., a corporation of Michigan Application September 17, 1956, Serial No. 610,287

6 Claims. (Cl. 340—174)

The present invention relates to static magnetic memory systems and more particularly to novel and improved apparatus for storing and detecting information in a magnetic matrix memory device.

Previous methods known in the art of selecting cores in a multi-dimensional static magnetic memory matrix and of detecting the output of the selected core during a read out operation have involved coupling each core of the matrix with a number of windings which is one greater than the number of dimensions of the matrix. Thus, for example, three dimensional memory matrices have in the past required four windings for each component core therewithin (i.e. 3 addressing windings and one read-out winding). Although it may have been recognized heretofore that with each additional winding which is coupled to each core of the matrix the effective resistance of each winding is increased, the amount of varnish insulation permissible per winding is decreased, and the tedious stringing or winding operation is complicated, considerable difficulty has been experienced in the past in effectively reducing the required number of windings per core with facility and certainty in the accuracy of results without the use of involved circuitry or apparatus.

Accordingly, it is a principal object of the present invention to provide novel and improved apparatus for reducing the required number of windings per core within a multi-dimensional magnetic memory matrix.

It is a further object of the present invention to provide novel and improved apparatus for storing binary information within a static magnetic core matrix wherein one winding of each core of the matrix is used as an inhibit winding during the read-in operation as well as a sensing winding during the read-out operation.

Other objects and many of the attendant advantages of the subject invention will be readily appreciated as the same becomes better understood by reference to the following detailed description which is considered in connection with the accompanying drawings wherein.

Figure 1:
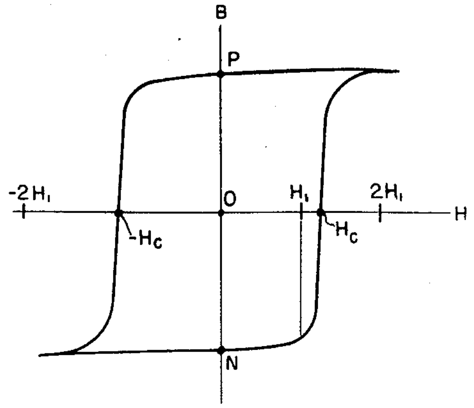
Figure 1 is a typical B—H hysteresis curve of a suitable magnetic core material for use in the present invention.

Before describing in detail a preferred embodiment of the present invention, characteristic properties of the rectangular hysteresis material out of which the cores of a suitable static magnetic memory matrix should be constructed will be described. The B—H curve of a magnetic core material suitable for the purposes of the invention and its relatively rectangular properties is shown in Figure 1 of the drawing. The points P and N on the curve represent the remanent magnetic states of the core material after the magnetomotive force developed by current flow of sufficient magnitude in exciting windings in one direction or the other has been removed. Thus, for example, the point P represents the state of the core material after current of sufficient magnitude is applied through energizing windings to develop flux through the core in a positive direction and is then removed. Point N represents the negative remanent state of the core after a flux in the opposite direction is developed and removed. When the core occupies its negative remanent state at N an applied magnetizing force $H_1$, no matter how often applied and removed, will not materially affect its remanent condition. A magnetizing force of $2H_1$, however, will cause the core to switch from N to P and bring about a complete reversal of flux in the core. Similarly, only a force greater than $-Hc$, produced by a current flowing through energizing windings in the opposite direction will change the core from state P to state N.

Material having substantially rectangular hysteresis loops have been used heretofore to store electrical information. In such applications as in the present invention the disposition of the core at states P and N is said to correspond to the storage of the binary digits 0 and 1 (or 1 and 0). A digit is placed or read into the core by passing a current of intensity sufficiently greater than $Hc$ in the proper direction through its energizing cell. To read out information stored in a given core a current sufficiently greater than $Hc$ is again applied to the energizing coil in a predetermined positive or negative direction. If the reading force is positive and the core was already at state P, there is little change in flux density within the core and only a relatively small voltage is induced in the output circuit. If, however, the core was at State N when the positive reading force is applied, the core switches to state P and a substantial voltage is induced in the output circuit. Thus, it is seen that by energizing a core with a pair of coincident currents which separately produce an H force and together produce a 2H force, a core having a substantially rectangular hysteresis loop can be used to store binary information which can later be detected by applying a second 2H force of known polarity.

In the three dimensional coordinate system each core is identified or addressed within the matrix by coincidence of up to three flux producing currents. The selected core, which is disposed within the matrix at a position defined by the intersection of three core energizing conductors that ordinarily extend along three mutually perpendicular coordinates of the matrix system, is generally energized by currents in two of the core energizing conductors each of which produce additive magnetomotive forces of H (or a total force of 2H), which remains uninhibited by a negative magnetizing current in the third core energizing conductor. The various unselected cores within the matrix are either not magnetized at all or are effected by a flux having a magnetomotive force of H such that no change of state of the core is produced. Thus, while information is stored in the selected core, the other cores of the matrix remain unaffected.

Figure 2:
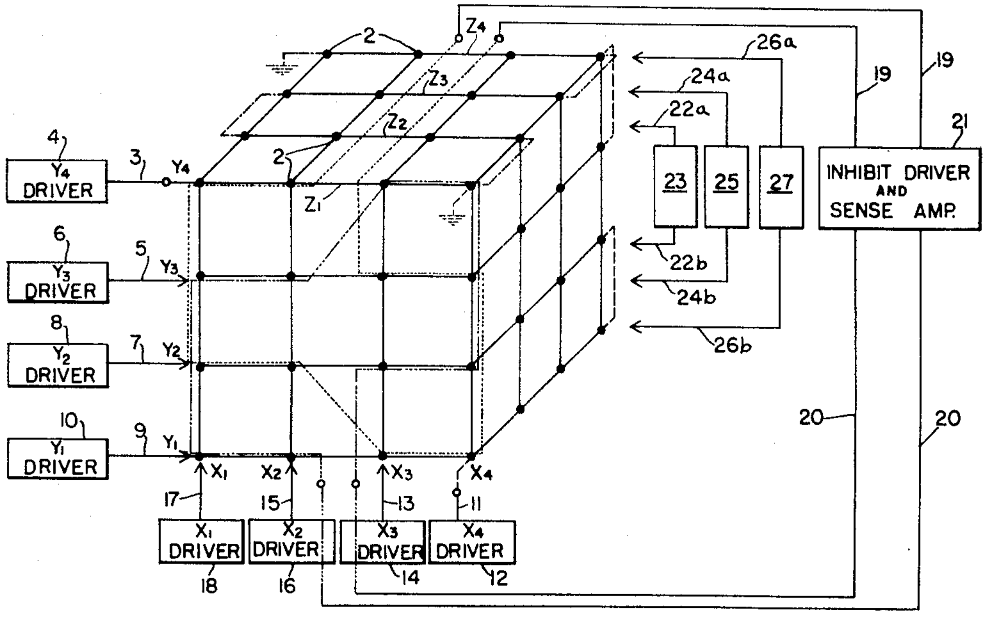
Figure 2 is a diagrammatic view of a preferred embodiment of the present invention.

Referring now to Fig. 2 of the drawing wherein a preferred embodiment of the present invention is illustrated, it is seen that a plurality of cores 2 are preferably arranged in four rows, four columns and four stacks or planes along three mutually perpendicular axes of an X—Y—Z coordinate system to form a 3-dimensional 64-core matrix. The matrix may be referred to as having four XY planes, four XZ planes, and four YZ planes. Each plane includes sixteen cores. Each core is common to one XY plane, one XZ plane and one YZ plane. Cores in each XZ plane, i.e., cores occupying similar positions on the Y-axis (the vertical axis) of the matrix are coupled by windings, preferably consisting of a single turn, to a common conductor driven by a conventional driver circuit. Thus, for example, each of the sixteen cores in the XZ plane having Y4 as a vertical coordinate in the matrix of Figure 2 are series coupled to the winding conductor 3 and driven by the driver 4. Similarly, although the series circuits are not shown in detail in the drawing in order to simplify the same, the three sixteen-core XZ planes having $Y_1$, $Y_2$ and $Y_3$, respectively, as vertical coordinates are respectively series coupled to winding conductors 5, 7 and 9 and driven by drivers 6, 8 and 10.

Cores in each YZ plane, i.e., cores occupying similar positions on the X axis (the horizontal axis) of the matrix are also preferably coupled by single turn windings to a common conductor driven by another conventional driver circuit. Thus, for example, each of the sixteen cores in the YZ plane having $X_4$ as a horizontal coordinate is series coupled to the winding conductor 11 driven by the driver 12. Similarly, though not shown in detail in the drawing for the sake of simplicity, the three sixteen-core YZ planes having $X_3$, $X_2$ and $X_1$ as horizontal coordinates are respectively coupled to winding conductors 13, 15 and 17 and driven by driver circuits 14, 16 and 18.

One half of the cores in each of the XY planes (i.e. planes occupying the $Z_1$, $Z_2$, $Z_3$ and $Z_4$ positions on the Z axis) of the matrix are series coupled by single turn windings to a common conductor driven by still another driver and sensing circuit, there being a different common conductor and a different driver and sensing circuit for each XY plane. The other half of the cores in each of the XY planes of the matrix are series coupled by single turn windings to another common conductor driven by the same driver sensing circuit as the first-mentioned one half of the cores. Thus, for example, as shown in Figure 2 of the drawing, eight of the cores in the XY plane occupying the $Z_1$ position on the Z axis are series coupled to the winding conductor 19, the other eight of the cores of the XY plane occupying the $Z_1$ position are series coupled to the winding conductor 20 and both winding conductors 19 and 20 are driven by the same inhibit driver and sense amplifier 21 in a manner which will be described more fully hereinafter. Similarly, although not shown in the drawing for the sake of simplicity, the cores of the XY planes occupying the $Z_2$, $Z_3$ and $Z_4$ positions of the matrix are respectively subdivided into equal subgroups of eight cores each, and each subgroup is coupled respectively to winding conductors 22*a* and 22*b* (XY plane $Z_2$), windings 24*a* and 24*b* (XY plane $Z_3$) and windings 26*a* and 26*b* (XY plane $Z_4$) and driven respectively by driver and sensing circuits 23, 25 and 27. Thus, it is seen that each core of the matrix is coupled by a total of three windings.

Figure 3:
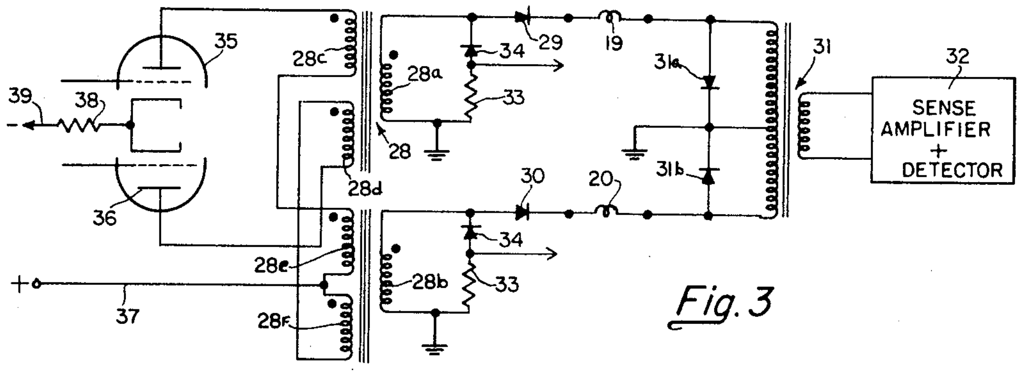
Figure 3 is a detailed schematic view of one of the inhibit driver sense amplifier circuits shown in Figure 2.

Referring now to Figure 3 of the drawing wherein the inhibit driver and sense amplifier circuit 21 of the XY plane occupying the $Z_1$ position is shown in greater detail, it is seen that the winding conductors 19 and 20 are each series connected in a loop circuit which in the case of conductor 19 extends from the grounded extremity of the secondary winding 28*a* of inhibit driver transformer 28 through diode 29, winding 19 and through the upper half of the split primary winding of the sense amplifier transformer 31 to ground. Winding conductor 20 is similarly connected in a lower-loop circuit comprising transformer winding 28*b*, diode 30, winding 20, and the lower half of the split transformer winding 31. Diodes 31*a* and 31*b* are separately connected as shown across the split windings of transformer 31, and the sense amplifier 32 which may be of any suitable conventional design is electrically coupled across the output terminals of the secondary winding of transformer 31. The series connected resistors 33 and diodes 34 are connected across the output terminals of the secondary windings 28*a* and 28*b* of transformer 28 in order to more effectively dampen transient oscillations produced therein when the inhibit circuit which is described more fully hereinafter is energized.

The primary windings 28*c*, 28*d*, 28*e* and 28*f* of transformer 28 are shown to be driven by the triode circuits of tubes 35 and 36 of the inhibit driver circuit. Thus, the plate circuit of tube 35 extends from the positive side of the 200 volt supply line 37 through primary windings 28*e* and 28*c*, the tube 35, and resistor 38 to the negative side of the 200 volt supply line 39. The plate circuit of tube 36 extends from the positive side of the 200 volt supply line 37 through primary windings 28*f* and 28*d*, the tube 36 and resistor 38 to the negative side of the 200 volt supply line 39. As is indicated immediately hereinafter, the control grids of tubes 35 and 36 are normally biased to cut-off but are separately and alternately driven in a positive direction in any suitable manner which is compatible with the computer system or the like with which the memory matrix of the present invention is to be used.

While the foregoing describes specifically the inhibit driver and sense amplifier 21 of the XY plane occupying the $Z_1$ position on the Z-axis in Fig. 2, it is to be understood that circuits 23, 25 and 27 of the XY planes occupying the $Z_2$, $Z_3$ and $Z_4$ positions are similarly constructed.

In the matrix shown in Fig. 2, the four XY planes occupying the $Z_1$, $Z_2$, $Z_3$ and $Z_4$ positions on the Z-axis correspond respectively to the four binary digits 1, 2, 4 and 8. During the "read-out" operation, all four XY planes are read out in parallel, i.e., read out simultaneously, as will be explained later. Similarly, during the "read-in" operation, all four XY planes are "read in" in parallel, i.e., simultaneously. This is accomplished by energizing simultaneously those of the inhibit driver circuits 21, 23, 25 and 27 which are associated with the XY planes into which a "0" is to be inserted, and by failing to energize those of the inhibit drivers associated with XY planes into which a "1" is to be inserted. This will now be explained more fully.

In the operation of the apparatus shown in Figs. 2 and 3, when it is desired to "read-in" a "0" upon a preselected core such as the X2, Y2, core of XY plane occupying the $Z_1$ position in the matrix of Figure 2, drivers 8 and 16 are energized to develop current flow through conductors 7 and 15 to produce $+H_1$ magnetizing forces simultaneously in each of the sixteen cores of the XZ plane occupying a $Y_2$ position on the Y axis and in each of the sixteen cores of the YZ plane occupying an $X_2$ position on the X axis. Thus, the four cores which are common to both of these planes each receives a total magnetizing force of $+2H_1$. At the same instant, however, a positive going pulse is delivered to the grid of tube 36 of inhibit driver 21 and a similar positive pulse is simultaneously applied to the grid of the corresponding tube 36 of any one of the other inhibit drivers 23, 25 or 27 associated with a plane into the $X_2$, $Y_2$ cores of which a "0" is to be inserted. Such positive pulses are effective to energize the plate circuits of the tubes to which such pulses are applied and cause current surges through the corresponding primary windings 28*d* and 28*f* of their respective transformers 28. This current flow induces voltages which are substantially equal in magnitude at the dot terminals of secondary windings 28*a* and 28*b* of each of the energized inhibit transformers 28 and equal currents are driven through diodes 29 and 30 and winding conductors 19 and 20 and through each half of the split primary winding of transformer 31 to ground. Similar currents are, of course, driven through the corresponding diodes, winding conductors and split-winding primary of other XY planes into the $X_2$, $Y_2$ cores of which a "0" is being inserted. Since these currents through the upper and lower halves of transformer winding 31 are equal in magnitude and opposite in sense, their opposite energizing effects on the secondary winding of transformer 31 cancel and thus no output is detected in the respective sense amplifier 32 of the XY plane during the "read-in" operation of a "0" into the $X_2$, $Y_2$ core of that particular plane. The current flow through the energized winding conductors 19 and 20 (or through windings of other planes which correspond to windings 19 and 20 of the XY plane occupying the $Z_1$ position) develops a $-H_1$ magnetizing force upon each of the cores in each XY plane whose inhibit driver is energized. Thus it will be seen that in those XY planes whose inhibit drivers are energized simultaneously with the energization of the X and Y drivers, each of the cores is inhibited from switching, including the four cores at the intersection of the $X_2$ and the $Y_2$ coordinates which also are inhibited. However, in those XY planes whose inhibit drivers are not energized, no inhibit current is passed through the windings corresponding to windings 19, 20 and accordingly each preselected $X_2$, $Y_2$ core receives an mmf. which is sufficient to switch it from its 0 to its 1 state.

In order to return the core material of transformer 28 which has a linear BH characteristic to its original condition of magnetization prior to the next succeeding inhibit pulse, the control grid of tube 35 of each inhibit driver the tube 36 of which had been energized is then energized to fire the tube 35 and develop a flux in the opposite sense through windings 28*c* and 28*e* of transformer 28. Diodes 29 and 30 in the output loop circuit of transformer 28 are poled to prevent current flow through and energization of transformer 31 by this recovery pulse. Thus, no signal is developed in detector 32 when tube 35 is pulsed to effect recovery of transformer 28.

When it is desired to "read-out" the information stored in the $X_2$, $Y_2$ cores, drivers 8 and 16 are energized to develop negative voltage pulses thereby to drive current flow through conductors 7 and 15 to produce a pair of $-H_1$ forces simultaneously in the $X_2$, $Y_2$ core of each of the four XY planes. This net $-2H_1$ force in each $X_2$, $Y_2$ core is sufficient to switch any core which is in the "1" state to its 0 state. When the core switches from 1 to 0, a voltage is induced in one but not both of the winding conductors 19, 20, or in conductors corresponding thereto in the other XY planes. In the present example, since it is the $X_2$, $Y_2$ cores which are being "read out," the voltage is induced in winding 19 of the XY—$Z_1$ plane and in the winding corresponding to winding 19 in any of the other XY planes in which the $X_2$, $Y_2$ core switches from the "1" to the "0" state when drivers 8 and 16 deliver negative voltage pulses for "read-out" purposes. The voltage induced in winding 19, or in the corresponding winding in the other planes, causes current to flow through a circuit which includes in series the upper half of the split primary winding of transformer 31 the secondary winding 28*a* of transformer 28, and diode 29. Winding 20 does not pass through the $X_2$, $Y_2$ core and hence there is no current flow through the lower half of the primary winding of transformer 31. Since the inductance of the secondary winding 28*a* of the inhibit transformer is much lower than the inductance of the upper half of the primary winding of the sense amplifier transformer 31, most of the output voltage induced in winding 19 by the switching of the core appears across the sense amplifier transformer 31 and the 1 in the core is thereby detected by circuit 32 or "read out."

Thus, it is seen that the same winding conductor in the XY plane is used as an inhibit winding during the "read-in" operation and as a sense winding during the "read-out" operation and that a total of three rather than four windings per core in the three dimension matrix shown in Figure 2 is needed to satisfy the requirements of an effective fast access memory system.

Although the three dimensional arrangement of magnetic cores in a memory matrix of the type described above provides easy visualization of the method of locating a core using three core energizing windings, it is to be understood that each core could be wound or linked by an equal number of four or more windings and located or addressed and detected by the use of four or more coincident currents rather than three without departing from the spirit or scope of the present invention. Matrices having three or more windings per core have been and will be designated for convenience throughout the present specification and claims as multi-dimensional matrices. Similarly it is to be understood that the cores of the matrix of Figure 2 of the drawing could be physically arranged to assume any geometrical configuration rather than that of the cube shown without departing from the spirit or scope of the present invention as long as the cores of the matrix are wired in an orderly electrical multi-coordinate system which permits core selection by energization of one winding of the selected core for each coordinate of the system.

Obviously many other modifications and variations of the present invention are possible in the light of the above teachings. It is therefore to be understood that within the scope of the appended claims the invention may be practiced otherwise than as specifically described.

We claim:

1. An information storage device comprising a plurality of static magnetic cores, each core having a relatively rectangular hysteresis loop characteristic and a pair of stable states; means for arranging the cores electrically in rows, columns and stacks along three mutually perpendicular axes to form a three dimensional matrix; a first group of circuits including a circuit for each array of cores occupying similar positions along first axis of the matrix, each said circuit of said first group including in series a winding which is coupled to each of the cores of its respective array; a second group of circuits including a circuit for each array of cores occupying similar positions along a second axis of the matrix, each said circuit of said second group including in series a winding which is coupled to each of the cores of its respective array; a third group of circuits including a pair of circuits for each array of cores occupying similar positions along a third axis of the matrix, each of said pair of circuits of said third group including in series a winding which is coupled to one-half of the cores of its respective array; means responsive to energization of one circuit only of each of the said first and second groups of circuits and to selective energization or non-energization of one of said pair of circuits of said third group for reading "0" or "1" binary information respectively, according to whether or not said circuit of said third group is energized, into one core of a selected group of cores located at the intersection of said first and second axes of the matrix; and means responsive to energization of a circuit of each of the said first and second groups of circuits only, said energization being in an opposite sense relative to the energization applied during read-in, for deriving from said third group of circuits a read-out signal in response to one of said selected group of cores switching in response to said opposite-sense energization.

2. A magnetic memory system comprising a plurality of magnetic cores each capable of assuming either of two stable states of magnetic remanence, said magnetic cores being arranged electrically in columns and rows to form a plurality of core planes each normal to one of three mutually perpendicular X, Y and Z axes; a plurality of Y windings, each Y winding coupling in series all of the cores located in the same plane on the Y axis; separate driver means for each Y winding; a plurality of X windings, each X winding coupling in series all of the cores located in the same plane on the X axis; separate driver means for each X winding, said Y and X driver means being adapted to be energized selectively on either a positive or negative sense to drive current in either one direction or the other through the winding associated therewith of a magnitude to exert a magnetizing force of either +H or −H on each core coupled to said winding, where H is less than the coercive magnetizing force necessary to switch a core from one stable state to the other but where 2H is greater than said coercive force; a plurality of $Z_a$ windings, each $Z_a$ winding coupling in series one half of the total number of cores located in the same plane on the Z axis; a plurality of $Z_b$ windings, each $Z_b$ winding coupling in series the other one-half of the cores located in the same plane on the Z axis; common Z driver means for each pair of $Z_a$ and $Z_b$ windings coupling cores located in the same plane on the Z axis, there being a separate common Z driver means for each different pair of $Z_a$ and $Z_b$ windings, said common Z driver means being adapted when energized to drive current through the $Z_a$ and $Z_b$ windings associated therewith of a magnitude and in a sense to exert a magnetizing force of $-H$ on each core coupled to said winding; means effective during a first time period for energizing simultaneously and in a positive sense one only of said X driver means and one only of said Y driver means and for energizing selected ones of said Z driver means, thereby to effect switching from the "0" to the "1" state of only those cores which are coupled to windings connected to both of said energized X and Y driver means and also to the non-selected Z driver means and to inhibit switching of those cores which are coupled to windings connected to both of said energized X and Y driver means and also to said selected Z driver means, thereby to read a "1" into each of said cores which switches and a "0" into each of said cores which does not switch; means effective during a second time period for energizing simultaneously in a negative sense said one only of said X driver means and said one only of said Y driver means and for maintaining all of said Z driver means deenergized, thereby to "read-out" the cores coupled to both of said X and Y negatively-energized driver means by switching or tending to switch said coupled cores to the "0" state; and separate read-out means coupled to each of said Z driver means and adapted to utilize said $Z_a$ and $Z_b$ windings to sense the switching to the "0" state of a core coupled thereto.

3. Apparatus as claimed in claim 2 characterized in that each of said common Z driver means for each of said pair of $Z_a$ and $Z_b$ windings includes a first and a second transformer, said first transformer having a primary winding driven by a source of driver current and a pair of secondary windings one of which is connected in series with the $Z_a$ winding and the other of which is connected in series with the $Z_b$ winding, said second transformer having a secondary winding and a split primary winding one section of which is connected in series with said $Z_a$ winding and the other section of which is connected in series with said $Z_b$ winding, the arrangement being such that the current driven through said $Z_a$ and $Z_b$ windings in response to the energizing of said common Z driver means causes current to flow through each of said two sections of said split-primary winding in a direction and magnitude to exert substantially equal and cancelling magnetizing forces on said second transformer, whereby no voltage is induced in the secondary of said second transformer during read-in of a "0" into a core coupled to said $Z_a$ or $Z_b$ winding.

4. Apparatus as claimed in claim 3 characterized in that said read-out means includes means connected to said secondary of said second transformer for sensing the voltage developed in either section of said split-primary winding resulting from current driven therethrough by the voltage induced in a core coupled to either said $Z_a$ or $Z_b$ winding by the switching thereof from the "1" to the "0" state.

5. Apparatus as claimed in claim 1 characterized in that each of said pair of circuits of said third group has a common driver means for each pair, said common driver means including a first and a second transformer, said first transformer having a primary winding driven by a source of driver current and a pair of secondar windings one of which is connected in series with one circuit of the pair and the other of which is connected in series with the other circuit of the pair, said second transformer having a secondary winding and a split primary winding one section of which is connected in series with one circuit of the pair and the other section of which is connected in series with the other circuit of the pair, the arrangement being such that during read-in of a "0" the current driven through the said one and other circuits of the pair in response to the energization of the said common driver means causes current to flow through each of said two sections of said split primary winding in a direction and magnitude to exert substantially equal and cancelling magnetizing forces on said second transformer, whereby, during read-in of a "0" into a core coupled to said one or other circuit of said pair no voltage is induced in the secondary of said second transformer.

6. Apparatus as claimed in claim 5 characterized in that said read-out means includes means connected to said secondary of said second transformer for sensing the voltage developed in either section of said split primary winding resulting from current driven therethrough by the voltage induced in the core coupled to either said one or other circuit of the pair by the switching thereof from the "1" to the "0" state.

References Cited in the file of this patent

UNITED STATES PATENTS

| | | |
|---|---|---|
| 2,739,300 | Haynes | Mar. 20, 1956 |
| 2,784,391 | Rajchman et al. | Mar. 5, 1957 |

UNITED STATES PATENT OFFICE

CERTIFICATE OF CORRECTION

Patent No. 2,915,740 December 1, 1959

James B. Ricketts, Jr., et al.

It is hereby certified that error appears in the printed specification of the above numbered patent requiring correction and that the said Letters Patent should read as corrected below.

Column 3, line 64, for "separately" read -- preferably --; column 8, line 20, for "secondar" read -- secondary --.

Signed and sealed this 26th day of July 1960.

(SEAL)
Attest:

KARL H. AXLINE
Attesting Officer

ROBERT C. WATSON
Commissioner of Patents